(No Model.)

T. F. RANDOLPH.
Telescope Attachment to Surveyors' Compasses.

No. 234,332.   Patented Nov. 9, 1880.

Attest.

Inventor.
Theodore F. Randolph
by James H. Layman
His Attorney.

UNITED STATES PATENT OFFICE.

THEODORE F. RANDOLPH, OF CINCINNATI, OHIO.

TELESCOPE ATTACHMENT TO SURVEYORS' COMPASSES.

SPECIFICATION forming part of Letters Patent No. 234,332, dated November 9, 1880.

Application filed August 30, 1880. (No model.)

*To all whom it may concern:*

Be it known that I, THEODORE F. RANDOLPH, of Cincinnati, Hamilton county, Ohio, have invented certain new and useful Improvements in Surveyors' Compasses, of which the following is a specification.

My improvement comprises a novel telescope attachment adapted for use with those compasses having a pair of sight-vanes, said attachment being so arranged as to cause the visual axis of the telescope to be exactly in the same vertical plane with the zero of the dial or compass-circle after said vanes have been temporarily removed, as hereinafter more fully described, and pointed out in the claim.

Figure 1:
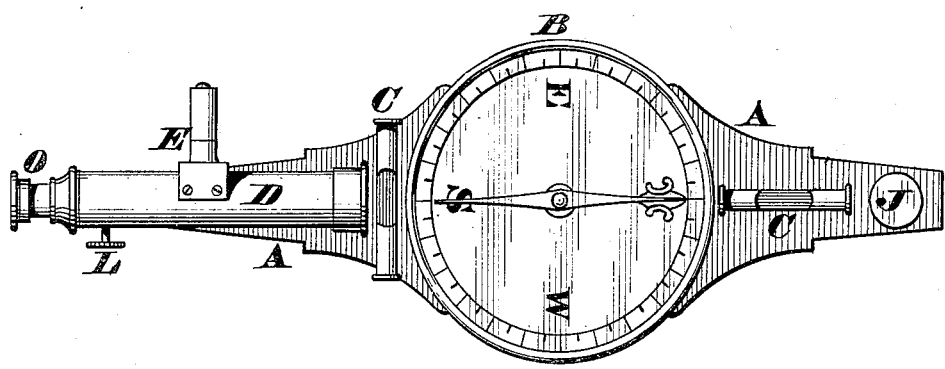
Figure 2:
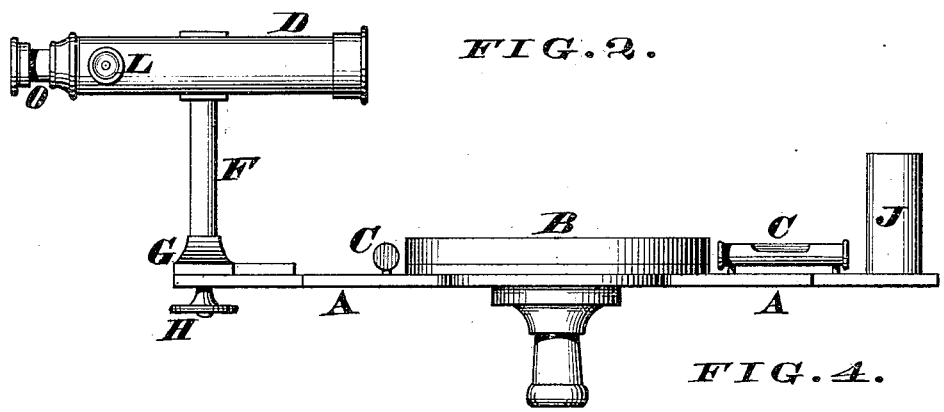
Figures 3, 4:
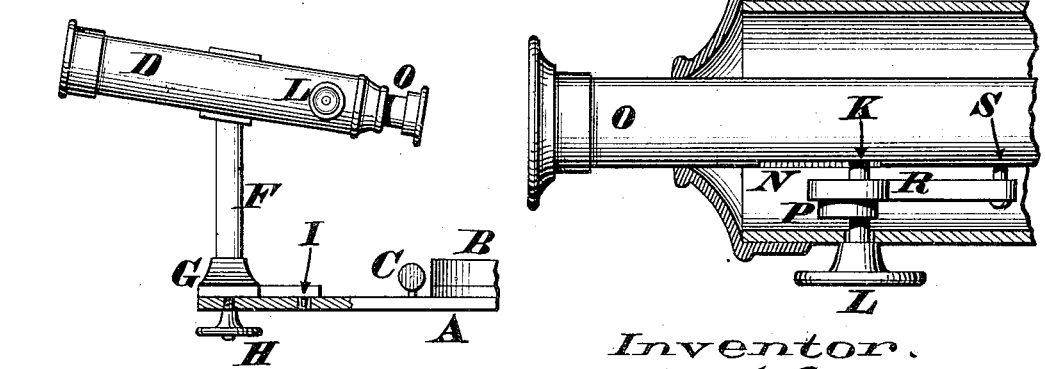

In the annexed drawings, Figure 1 is a plan of a surveyor's compass provided with my telescope attachment, and Fig. 2 is a side elevation of the same. Fig. 3 is a side elevation of the south end of the compass, the telescope being shown reversed for taking a back sight. Fig. 4 is an enlarged axial section of the telescope, taken in the plane of the eccentric mechanism.

A represents an elongated compass-plate, such as ordinarily applied to those instruments having a pair of sight-vanes, said plate being furnished with a circle, B, levels C, and any other appropriate attachments. Applied to either end of this plate, but preferably to the south end, is a telescope, D, having the usual cross-wires, and being swiveled at E to turn readily in a vertical plane on a standard or pillar, F, the foot of which, G, may be secured in position with the same screw H that is employed for attaching the sight-vane to said plate A. Furthermore, this foot may have a steady-pin, I, or other suitable guide, to insure the telescope being located exactly in line with the zero of the compass-circle B.

Applied to the opposite end of plate A is a poise, J, that counterbalances the weight of telescope D and its accessories, said poise being attached in any convenient manner, or being a fixture to the instrument.

Telescope D is perforated near its rear end to admit a shaft, K, (seen in Fig. 4,) the outer end of said shaft being furnished with a milled head, L, while its concealed end is journaled in the longitudinal slot N of the eye-piece tube O.

Shaft K has keyed to it an eccentric, P, revolving within a yoke or box, R, which latter is coupled at S to the tube O.

In fitting up my instrument the utmost care is taken to locate the visual axis of the telescope D accurately in line with the zeros of circle B, and consequently, when either of the sight-vanes is removed and the telescope temporarily applied to plate A, a vertical plane cutting through the axis of the tubes D O will pass through the north and south points of the compass. Such being the case, it is evident the telescope D can be elevated or depressed at any angle, or completely reversed, so as to take a back sight without in the least interfering with its accurate alignment with the zeros.

The eccentric mechanism seen in Fig. 4 is another advantage peculiar to my instrument, as it enables the telescope to be focused without causing either of the tubes D or O to jerk or move irregularly, as they do when racks and pinions are employed for this purpose, as such gearings soon wear and thereby prevent a smooth movement of the eye-piece. In addition to this advantage, the tube O can be advanced and then retracted without reversing the rotation of shaft K, and this result will be accomplished whether said shaft be turned to the right or left. Evidently the same results can be accomplished by using a crank instead of the cam P and a connecting-rod in place of the yoke R; but, as a general thing, there is not sufficient clearance between the tubes D and O to admit such equivalent devices.

I am aware it is not new to mount telescopes directly above the compass-circle and maintain the visual axis of the former in line with the zeros of the latter, as such a construction is seen in theodolites, transit-instruments, &c., and also in the patent granted to me June 24, 1879; also, I am aware it is not new to apply a swivel telescope at the side of one of the sight-vanes, and then make allowance for such an offset when the readings are taken from the compass, as this construction of instrument is seen in Letters Patent No. 205,742, issued July 9, 1878, to William and Lewis E. Gurley.

Such being the state of the art, my claim is not to be construed as an attempt to cover, broadly, a telescope in line with the zeros of a compass; but the claim is limited to a telescope when applied to those instruments having an elongated plate or arms for attachment of the sight-vanes, in order that the telescope may be readily applied to the plate after the removal of either of said vanes and be free to swing in a plane exactly vertical with said zeros, as herein described and illustrated.

I claim as my invention—

The swivel telescope D, in detachable combination with the elongated plate A of a surveyor's compass, said telescope being situated at one end of the plate for the purpose of exposing the entire circle B, and having its visual axis exactly in the same vertical plane as the zeros of said circle, as herein described.

In testimony of which invention I hereunto set my hand.

THEODORE F. RANDOLPH.

Witnesses:
JAMES H. LAYMAN,
JEREMIAH F. TWOHIG.